(12) United States Patent
Aguergaray et al.

(10) Patent No.: US 9,705,276 B2
(45) Date of Patent: Jul. 11, 2017

(54) GIANT-CHIRP OSCILLATOR (71) Applicant: SOUTHERN PHOTONICS LIMITED, Auckland (NZ)

(72) Inventors: Claude Aguergaray, Auckland (NZ); Miro Juhani Erkintalo, Auckland (NZ); Antoine Francois Jacques Runge, Auckland (NZ); Neil Gregory Raphael Broderick, Auckland (NZ)

(73) Assignee: Southern Photonics Limited, Auckland (NZ)

( * ) Notice: Subject to any disclaimer, the term of this patent is extended or adjusted under 35 U.S.C. 154(b) by 0 days.

(21) Appl. No.: 14/407,655

(22) PCT Filed: May 6, 2013

(86) PCT No.: PCT/NZ2013/000079
§ 371 (c)(1),
(2) Date: Dec. 12, 2014

(87) PCT Pub. No.: WO2013/187774
PCT Pub. Date: Dec. 19, 2013

(65) Prior Publication Data
US 2015/0200518 A1    Jul. 16, 2015

(30) Foreign Application Priority Data
Jun. 14, 2012  (NZ) ........................ 600623

(51) Int. Cl.
H01S 3/067     (2006.01)
H01S 3/11      (2006.01)
H01S 3/16      (2006.01)

(52) U.S. Cl.
CPC ...... *H01S 3/06791* (2013.01); *H01S 3/06712* (2013.01); *H01S 3/06725* (2013.01); *H01S 3/06783* (2013.01); *H01S 3/1112* (2013.01); *H01S 3/1618* (2013.01)

(58) Field of Classification Search
CPC ............ H01S 3/06791; H01S 3/06725; H01S 3/06783; H01S 3/08059
See application file for complete search history.

(56) References Cited

U.S. PATENT DOCUMENTS

| 7,817,684 | B2 | 10/2010 | Nicholson |
| 8,494,014 | B2 * | 7/2013 | Aguergaray ........ H01S 3/06791 372/18 |
| 2006/0198399 | A1 * | 9/2006 | Jablonski ............... B82Y 10/00 372/10 |
| 2008/0144676 | A1 * | 6/2008 | Nicholson ....................... 372/18 |
| 2010/0220751 | A1 * | 9/2010 | Chong .................. H01S 3/1118 372/6 |
| 2011/0002348 | A1 * | 1/2011 | Desbiens ......................... 372/6 |

(Continued)

OTHER PUBLICATIONS

International Search Report; PCT/NZ2013/000079; Sep. 9, 2013.

*Primary Examiner* — Tod T Van Roy
(74) *Attorney, Agent, or Firm* — Studebaker & Brackett PC (57) ABSTRACT A laser apparatus operable to generate giant chirp pulses. The pulses have a center frequency comprising an arrangement of components connected or connectable to form a closed ring cavity. The components comprise a first gain medium, an optical isolator, a length of single mode fiber, a mode locking device, an output coupler, and an optical filter. Each of the components are optical fiber based components.

12 Claims, 9 Drawing Sheets (56) References Cited

U.S. PATENT DOCUMENTS

2011/0075686 A1 3/2011 Liu
2011/0280263 A1 11/2011 Kieu et al.
2012/0327960 A1* 12/2012 Wise .................. H01S 3/06725
372/6

* cited by examiner

GIANT-CHIRP OSCILLATOR

FIELD OF THE INVENTION

The invention relates to a fibre laser and in particular to a giant chirp oscillator.

BACKGROUND TO THE INVENTION

A problem with fibre lasers in the prior art is they are often too unstable for use in industrial applications.

OBJECT OF THE INVENTION

It is an object of the present invention to provide a fibre laser which goes at least some way toward overcoming the abovementioned disadvantage or which at least provides the public with a useful choice.

Other objects of the invention may become apparent from the following description which is given by way of example only.

SUMMARY OF THE INVENTION

In a first aspect the present invention relates to a laser apparatus operable to generate an optical pulse comprising a sequentially connected arrangement of optical fibre based components to form a closed ring cavity including at least one gain medium, an optical isolator, a length of single mode fibre, a mode locking device, an output coupler and an optical filter.

In another aspect the present invention relates to a passively mode locked, ring fibre laser comprising a loop of polarisation maintaining, all normal dispersion single mode optical fibre, the loop including a section of polarisation maintaining rare-earth doped fibre gain medium, a length of polarisation maintaining single mode fibre and a polarisation maintaining nonlinear optical loop mirror.

In another aspect the present invention relates to a passively mode locked laser comprising two rings of polarisation maintaining all normal dispersion optical fibre, the first ring comprising a polarisation maintaining normal dispersion first gain medium, a polarisation maintaining normal dispersion optical filter, a polarisation maintaining normal dispersion optical isolator, and a length of polarisation maintaining normal dispersion single mode fibre, the second ring comprising a polarisation maintaining normal dispersion second gain medium, and wherein the first ring is optically coupled to the second ring by a wavelength division multiplexing optical coupler.

In another aspect the present invention relates to a laser apparatus operable to generate giant chirp pulses having a centre frequency comprising an arrangement of components connected, or connectable to form a closed ring cavity, the components comprising a first gain medium, an optical isolator, a length of single mode fibre, a mode locking device, an output coupler, and an optical filter, wherein each of the components are optical fibre based components.

In another aspect the present invention relates to a laser operable as a giant chirp oscillator, comprising a loop of substantially polarisation maintaining, substantially normal dispersion, optical fibre based components including a gain medium, a section of single mode fibre, and an nonlinear amplifying optical loop mirror.

In another aspect the present invention relates to a laser operable as a giant chirp oscillator, comprising at least two loops of polarisation maintaining, all normal dispersion optical fibre, a first loop comprising a polarisation maintaining normal dispersion first gain medium, a polarisation maintaining normal dispersion optical filter, a polarisation maintaining normal dispersion optical isolator, and a length of polarisation maintaining normal dispersion single mode fibre, a second loop comprising a polarisation maintaining normal dispersion second gain medium, and wherein the first loop is optically coupled to the second loop by a wavelength division multiplexing optical coupler.

In another aspect the present invention relates to a laser as claimed in claim 30 wherein the first loop further comprises wavelength division multiplexing optical coupler to couple a source of pump light into the first gain medium, the second loop further comprises wavelength division multiplexing optical coupler to couple a source of pump light into the second gain medium, and at least one of the sources of pump light are operable to mode lock the oscillator.

Preferably the optical fibre components are polarisation maintaining components.

Preferably the components have, or substantially have, a normal dispersion relative to the centre frequency.

Preferably the components have a net normal dispersion relative to the centre frequency.

Preferably the gain medium is operable to provide energy to a propagating pulse when pumped with a pump light source.

Preferably the mode locking device is passive.

Preferably the mode locking device is a nonlinear amplified loop mirror comprising at least an optical coupler operable to provide and input and an output, and a second gain medium operable to provide energy to a propagating pulse.

Preferably the second gain medium is operable to provide energy to a propagating pulse when pumped with light from a second pump light source.

Preferably the mode locking device is operable to mode lock the laser by varying the energy of the light from the second pump source.

Preferably the length of single mode fibre is operable in the cavity to receive light from the first gain medium and output light to the second gain medium.

Preferably the length of single mode fibre is operable to impart broadening to a pulse propagating within it.

Preferably the laser is operable to generate giant chirp pulses comprising a chirp that is substantially linear and positive.

Preferably varying the length of the single mode fibre varies at least one or more of the pulse repetition rate, the pulse energy or the pulse duration.

Preferably the optical filter has an operating bandwidth centred at or approximately at a desired pulse wavelength.

Preferably the output coupler couples up to 80% of the pulse energy from the cavity.

Preferably the length of single mode fibre is at least 0.5 m.

Preferably the length of single mode fibre is up to 1000 m.

Preferably the pulses are compressible to less than 120 fs.

Preferably the pulses have a duration of at least 4 ps.

Preferably the pulses have a duration of up to 150 ps.

Preferably the pulses have a repetition rate of at least 1.4 MHz.

Preferably the pulses have a repetition rate of up to 15 MHz.

Preferably the pulses have spectral bandwidth of at least 3 nm.

Preferably the pulses have spectral bandwidth of up to 26 nm.

Preferably the pulses have spectral bandwidth of up to 40 nm.

Preferably the pulses have energy of at least 10 nJ.

Preferably the pulses have energy of up to 20 nJ.

Preferably the length of single mode fibre has a mode area up to 20 µm.

In another aspect the present invention relates to a method of operating a laser comprising providing the laser of any one of the above statements, providing pump light to each gain medium in the laser, and adjusting the power of the pump light to achieve mode locking.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The term "single mode fibre" as used within this specification means a fibre capable of supporting a single mode of propagation and may comprise fibres comprising a 'larger than is currently standard' mode area of, for example, 20 µm squared or more.

The entire disclosures of all applications, patents and publications, cited above and below, if any, are hereby incorporated by reference.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

BRIEF DESCRIPTION OF THE DRAWINGS

The invention will now be described by way of example only and with reference to the drawings in which.

DETAILED DESCRIPTION OF THE INVENTION

A laser constructed from optical components each having normal dispersion is known as an all-normal dispersion (ANDi) laser and a particular operating regime of an ANDi laser is known as a giant chirp oscillator (GCO). A GCO has a laser cavity with a large optical length such that a pulse propagating within the laser has a large net normal dispersion effected upon it. A GCO typically produces a pulse that is temporally broad, has a low-repetition rate, high-energy and a very large linear chirp compared to other lasers.

Pulses from a GCO are useful for a wide range of applications such as micromachining, nonlinear imaging and spectroscopy. The possibility to control the pulse characteristic over a wide range is particularly important for chirped pulse amplification systems where, for instance, the possibility to design a seed oscillator with low repetition rate may eliminate the need for other external elements such as a pulse picker.

However, pulsed GCO lasers known in the prior art have been mode locked using either nonlinear polarization evolution (NPE) or saturable absorber (SA) mechanisms. Both NPE and SA mechanisms have a number of significant disadvantages that make them unsuitable for use as part of a laser in an industrial application. One disadvantage of an NPE is that it requires ongoing polarization angle adjustment. An NPE is generally restricted for use in a non-polarisation maintaining laser cavity. One disadvantage of a SA is that it suffers from limited longevity and limited power handling.

Only particular base lasers configurations can be converted into GCO lasers. Whether a base laser is a suitable candidate for becoming a GCO laser requires consideration of the interplay of effects between dispersion, nonlinearity and gain.

The invention allows the disadvantages of using an SA to be at least partially overcome by using a nonlinear amplifying loop mirror (NALM) as the mode-locking element.

Efforts to construct ANDi lasers mode-locked with a NALM have not been successful. One effort has produced a figure-eight laser that requires an external input to initiate pulsed operation. An external input can be provided by an electrically driven modulator to initiate mode locking and therefore pulsed operation. However, external modulation inputs add unwanted complexity and cost to a laser.

A further disadvantage associated with ANDi lasers mode-locked with a NALM is the low pulse energy, <2 nJ, and high repetition-rate, >33 MHz, thus making the laser inappropriate for many applications.

A further disadvantage of the figure-eight ANDi lasers mode-locked with a NALM is that the repetition rate cannot simply be modified without the laser becoming unstable. The pulse energy cannot be increased by amplification due to excessive breaking of the pulse that prevents mode-locking.

A further disadvantage associated with ANDi lasers mode-locked with a NALM is that the pulses produced by the laser has a pulse energy limited <2 nJ. Further amplification of those pulses results in significant wave breaking. The prior art lasers are also only able to couple a small portion of light out of the cavity which restricts the power the laser can generate. The remaining portion of light must remain within the cavity to maintain lasing.

A further disadvantage associated with ANDi lasers mode-locked with a NALM is that the laser must have short overall fibre lengths thereby dictating relatively high repetition rate and pulses with a short output pulse duration. High repetition rates and short output pulse duration causes significant peak power increase when passing through an amplifier. The large peak power of the pulse causes significant amounts of detrimental wave breaking.

Lasers constructed entirely from fibre based optical components have desirable qualities including compactness, lack of sensitivity to alignment and low production cost. However, mode lockable fibre based lasers that contain free-space and/or non-polarization maintaining elements are usually undesirable for use in industrial environments as they are critically hampered by their sensitivity to thermal and mechanical induced stress. Stress is known to change the birefringence characteristics of a non-polarization maintaining fibre based laser and cause degradation in laser performance or outright failure of the laser. Lasers constructed using non fibre based optical components, or free space components, or non-all-polarization maintaining elements require highly sophisticated packaging and construction to be suitable for industrial use due to their extreme sensitivity to environmental conditions and frequent tuning requirements.

Preferred embodiments of the invention relate to a GCO laser constructed entirely from polarization maintaining fibre based optical components. A benefit of using all fibre components is that the laser is impervious to thermally and/or mechanically induced stress. One example of the laser is operable to deliver pulse energies up to approximately 20 nJ without compromising the compressibility of the pulses below 500 fs. The laser may be tuned to adjust the output pulse energy, pulse duration and repetition rates to suit various applications. The laser may also operate at one of a variety of wavelengths by a selection of appropriate operating frequencies of components in the cavity. The laser may also offer the further advantage of generating output pulses that can readily be compressed to produce high peak power and short duration.

A GCO regime can be achieved when a length of single mode fibre (SMF) is inserted into the cavity. A detrimental build-up of excessive peak power in the cavity can be avoided by propagating the pulse through the length of SMF. The length of SMF allows the cavity to sustain pulses with larger energies that do not undergo wave-breaking by allowing the pulse to temporally broaden and maintain or reduce in amplitude. The length of SMF therefore allows for a significant increase in output pulse energy when further amplified under particular conditions.

The length of the various segments of SMF between components of the laser is of particular importance. The significance of the segments of SMF between components necessitates consideration of even trivial items, such as patch cords, which may otherwise be overlooked. Any variation in the lengths of SMF between components can lead to trivial or non-trivial modifications of the pulse propagation and thus affect the characteristics of the output pulse.

An advantage of the laser is that it comprises two gain mediums. A second gain medium implemented in the NALM is used to enable mode-locking and also provides further amplification of the pulse in addition to a first gain medium. The laser output characteristics may be varied by varying the relative gain provided by the two gain mediums.

Modulators to drive a mode locking device and devices to drive modulators increases the cost of manufacture and can increase the physical size of the laser. A further common issue with active mode-locking is that the driving signal must be quite precisely matched with the cavity length (longitudinal mode spacing). As the cavity length can change from thermal perturbations, a feedback loop is required to keep the modulator frequency matched which requires some form of additional electronics.

The laser according to preferred embodiments is passive in that it will advantageously mode lock without an external modulation source. Removing the need for a modulator reduces manufacturing cost and allows a smaller form factor. In one example the laser advantageously provides a relatively high pulse energy (>10 nJ) and low-repetition rate (<5 MHz) making it ideal as a front-end in CPA systems.

The laser is operable as a giant chirp oscillator, and has a loop of substantially polarisation maintaining, substantially normal dispersion, optical fibre based components including a gain medium, a section of single mode fibre, and an nonlinear amplifying optical loop mirror. Pump light is provided to each of the gain mediums to initiate mode locking and sustain pulsed operation.

The laser may also have at least two loops of polarisation maintaining, all normal dispersion optical fibre. A first loop has a polarisation maintaining normal dispersion first gain medium, an polarisation maintaining normal dispersion optical filter, a polarisation maintaining normal dispersion optical isolator, and a length of polarisation maintaining normal dispersion single mode fibre. A second loop has a polarisation maintaining normal dispersion second gain medium. The second loop is a NALM. The first loop is optically coupled to the second loop by a wavelength division multiplexing optical coupler.

The first loop further has wavelength division multiplexing optical coupler to couple a source of pump light into the first gain medium. The second loop has a wavelength division multiplexing optical coupler to couple a source of pump light into the second gain medium. At least one of the sources of pump light is operable in that the pump power can be varied to mode lock the oscillator. Pump light to the gain mediums should be maintained to sustain mode locked operation.

Figure 1:
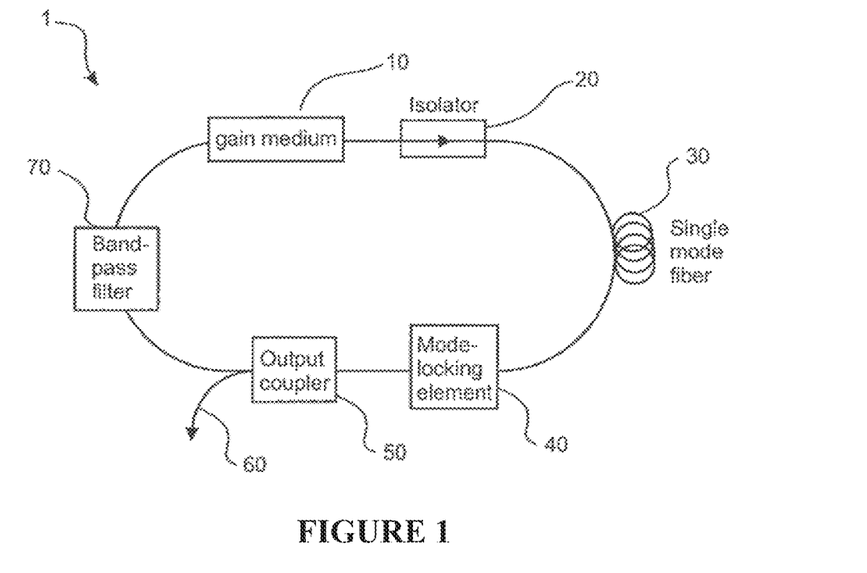
FIG. 1 shows one preferred embodiment of the laser adapted to form a ring or cavity laser known as a Giant Chirp Oscillator (GCO).

FIG. 1 shows one embodiment of the laser adapted to form a ring or cavity laser 1 known as a Giant Chirp Oscillator. The laser 1 is a sequential arrangement of optically coupled optical fibre based components. The laser 1 comprises a fibre based gain medium 10, a fibre based isolator 20, a length of single mode optical fibre 30, a fibre based mode locking device 40, a fibre based output coupler 50 adapted to provide an output 60 from the cavity, and a fibre based band-pass filter 70. The output of the filter 70 is connected to the input of the gain medium 10 to close the cavity. The particular order of the components in the cavity has some flexibility as will be discussed below.

Gain Medium

The gain medium 10 receives energy from a pump source (not shown). The gain medium 10 is operable to transfer energy from the pump to an optical pulse that is circulating in the cavity. Propagation of an optical pulse in the cavity is sustained when the gain medium 10 provides more energy to a circulating pulse than is lost by the pulse during its round-trip in the cavity.

The gain medium 10 can be provided by a number of different devices such as a single mode fibre, Ytterbium (Yb), an Erbium (Er), Neodymium, Holmium other rare-earth doped fibres. Those skilled in the art will appreciate the particular gain medium used will be related to the desired output wavelength of the pulses to be generated and sustained by the cavity. Further, those skilled in the art will appreciate the particular pump source required to enable a particular fibre to act as a gain medium will depend on the particular gain medium selected.

Preferably a rare earth-doped fibre is used as a gain medium as they usually provide greater amplification compared to a single-mode fibres (using Raman or parametric gain).

For example, if the desired output wavelength is around 1 micrometer, the potential rare-earth doped fibres gain medium that are operable to provide amplification at this wavelength are Ytterbium, or Neodymium doped fibres as they provide amplification of light around 1 micrometer.

In another example, if the desired output wavelength is around 1.5 micrometers, an Erbium-doped fibre would provide amplification around this wavelength provided that suitable normal dispersion fibres at that wavelength were used. Similarly, if the desired output wavelength is around 2 micrometers, a Thulium or Holmium-doped fibre would provide amplification.

In another example, if the desired output wavelength is around 1 micrometer, the gain medium selected can be a 5 meter long Yb-doped fibre pumped by a light source such as a laser diode of approximately 976 nm. A Yb-doped fibre gain medium is also preferable as they provide a broader emission band (advantageous for 'ultra short' pulses), high optical conversion efficiency, do not saturate easily and can be pumped with common telecommunications diodes.

Isolator

The isolator 20 is arranged in the cavity 1 such that light will propagate only in one direction. Preferably the output of the isolator 20 is coupled to the input of the length of SMF 30. However, the relative position of the isolator 20 and length of SMF 30 can be swapped as desired.

Length of SMF

The overall length of fibre in the cavity determines the pulse energy, pulse duration and repetition rate of the laser. The laser is preferably constructed entirely from polarization maintaining, single mode fibre and polarization maintaining optical components. It has been determined that polarization maintaining fibres provide the significant advantage of stabilising the cavity against environmental influences such as thermal and mechanical stress. Different types of SMF fibres may be used as long as the fibres substantially maintain a constant polarization state and have normal dispersion.

The SMF 30 preferably has a length of at least 0.5 m and may extend to hundreds of meters, and may extend to 1000 m. The output pulse energy, output pulse duration and the repetition rate of the pulses from the laser can be tuned by changing the length of the SMF 30.

The output of the length of SMF 30 is preferably coupled to the input of the mode locking device 40. However, it may be arranged elsewhere in the cavity with appropriate tuning changes made to the remaining devices that complete the cavity.

Mode Locking Device

The mode locking device 40 is adapted to enable the laser to operate in a pulsing condition rather than a continuous wave light source. The mode locking device 40 may be either an active device or a passive device.

An active device operates to promote pulsed operation by modulating the loss in a length of fibre or by modulating the phase of light propagating in the fibre. However, an active mode locking device requires an external driving source. A passive mode locking device is preferable as it does not require an external input to function and generally uses internally propagating light to create modulation. Passive mode locking devices are generally cheaper and easier to operate than active mode locking devices.

The mode-locking device 40 introduces losses that decrease as the power of the light that propagates within it increases. In this way, low optical powers experience a large loss and optical high powers experience small loss. The selectivity of the mode locking element promotes production of short optical pulses having a high power (and low losses) over a continuous optical wave having a low power (large losses).

A mode locking device may be implemented by several devices or techniques, such as nonlinear-polarization evolution (NPE), a saturable absorber (SA) a nonlinear optical loop mirror (NOLM) or a nonlinear amplified loop mirror (NALM).

It has been determined that saturable absorbers have several disadvantages including being prone to damage and once manufactured their operational parameters cannot be modified. Saturable absorbers must therefore always be chosen so as to suit the characteristics of a particular cavity. If the laser cavity does not mode lock, or does not mode-lock with the desired pulse characteristics, another saturable absorber must be purchased or the cavity modified. A NOLM suffers the same disadvantages.

A disadvantage of NPE is that it requires frequent adjustment of polarisation to maintain the pulse characteristics or to re-initiate mode-locked laser operation. Lasers utilising NPE suffer from long term reliability problems caused by thermal and mechanical perturbations. Small disturbances induce random fluctuations in fibre birefringence causing failure of mode-locking or changes in the output pulse characteristics in a non-polarization maintaining cavity. Lasers using NPE are not suitable for industrial applications due to the presence of sources of perturbations.

The inventors have determined the issue of polarisation stability can be overcome with the use of a NALM. A NALM does not suffer from polarisation maintaining limitations and allows construction of polarisation maintaining cavity whilst providing a degree of freedom through which the mode-locking ability can be tuned. A NALM, in preferred configurations of the laser, provides mode-locking and allows a robust polarisation maintaining cavity to be produced. The cavity is advantageously substantially insensitive to environmental influences such as thermal changes and vibration.

The preferred mode locking device 40 is a NALM. The preferred form of the NALM comprises an optical coupler, a gain medium and a length of SMF. One example of a NALM comprises a 55/45 coupler, a 0.5 m long segment of highly doped Yb fibre and a 2 m length of SMF. Preferably the Yb-doped fibre is operable to be pumped with a laser diode at 976 nm. Preferably the output of the mode locking device 40 is operatively coupled to the input of the output coupler 50.

The gain medium 10 and the NALM are separated by the SMF 30 that has a length significant enough to broaden the temporal pulse width thereby reducing the pulse peak power such that the pulse shape is substantially retained when further amplified in the NALM. The SMF 30 allows for the pulses to extract more energy from the pump in each gain medium without undergoing detrimental wave-breaking.

Output Coupler

The output coupler 50 provides a point in the cavity from which laser output power can be extracted and diverted to an output 60. One preferred form of the output coupler 50 is approximately an 80/20 coupler which diverts approximately 80% of the power to output 60 while maintaining approximately 20% inside the cavity. A wide range of output coupler ratios could be implemented. For example, a 70/30 coupler could be used.

Filter

Typically in a fibre laser the cavity boundary condition is satisfied by exciting a solution such that the pulse is unchanged at the beginning of each cavity round-trip. Alternatively, the cavity boundary condition is satisfied by managing pulse dispersion with segments of anomalous and normal dispersion such that the pulse broadens in the normal dispersion fibre segments and is compressed in the anomalous dispersion fibre. Each of these techniques requires fibre with anomalous dispersion.

In an all-normal dispersion cavity the pulse is continuously broadened throughout the cavity and simultaneously acquires a positive chirp. To preserve the cavity boundary conditions the pulse characteristics must be "reset" at the end of the round trip. The band pass filter 70 ensures a pulse propagating in the cavity is substantially the same at the beginning of each round trip. The filter 70 is operable to output a narrow spectral band of the pulse. Due to the all-normal cavity the pulses gather a strong positive chirp and consequently the spectral filtering also results in temporal shortening of the pulse.

The filter has, for example, a 1.7 nm bandwidth centred at or near the operation frequency. A filter with smaller or a larger bandwidth may also be used as desired. The filter may also be any component with a band-pass spectral transmission.

Operation

The length of SMF 30 acts as an intracavity pulse stretching mechanism. A pulse circulating in the cavity is amplified in the gain medium 10, temporally broadened by the length of SMF 30, and amplified and temporally shaped by the NALM. This configuration allows for a significant increase in pulse energy.

Tuning of the particular length of the SMF 30 advantageously allows the pulse characteristics to also be tuned. The energy and temporal duration of the output pulses will typically increase when the length of SMF is increased. In particular, the length of SMF 30 is tunable to temporally stretch the pulse between the two active fibres in the gain medium 10 and the NALM. This advantageously allows for the gain medium in the NALM to amplify the pulse without inducing detrimental wave-breaking effects. Further, higher output powers can be achieved than with merely the single gain medium 10 in the cavity.

Experimental Data

Figure 2:
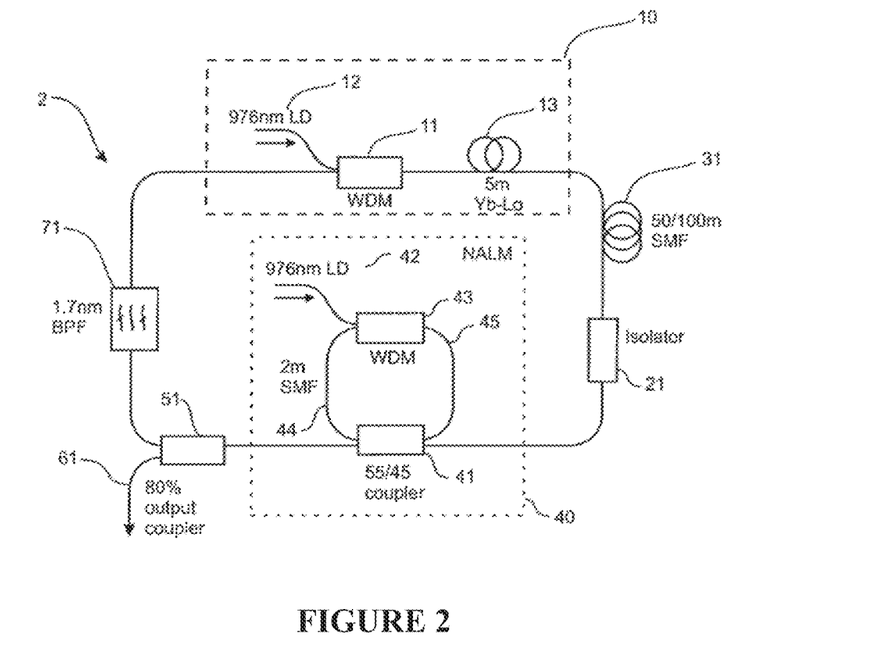
FIG. 2 shows another preferred embodiment of the laser.

FIG. 2 shows an example of a laser 2. The laser 2 has a gain medium 10 constructed from a length of low doped Yb doped fibre 13. The fibre 13 is pumped from a 976 nm diode based light source coupled into the gain medium through a wide band coupler 11. The output of the gain medium 10 is operatively coupled to the input of the length of SMF 31.

The length of SMF 30 is at least 0.5 m and may be up to 100 m in length without affecting the ability of the laser to mode lock in this configuration. The output of the length of SMF 31 fibre is connected to an optical isolator 21 which has an output connected to a mode locking device 41.

In this example, the mode locking device is a NALM comprising a 55/45 optical coupler 41 comprising a first connection operable to receive light from the isolator 21, a second connection operable to couple light to a length of SMF 44, a third connection operable to couple light to a 0.5 m length of highly doped Yb doped fibre 45 and a fourth connection operable to output light from the NALM.

The ends of SMF 44 and doped fibre 45 are connected to a wide band coupler 43 that allows the Yb doped fibre 45 to be pumped by a 976 nm diode based light source 42. The SMF 44 preferably has a length of at least 2 m and may be up to 5 m. The output from the NALM is connected to an output coupler 51.

The output coupler 51 is operable to provide a first light output 61 where 80% of the light is coupled from the cavity and a second output that is connected to a band pass filter 71. The filter 71 has a bandwidth of 1.7 nm and preferably has a centre frequency located substantially at the desired pulse centre frequency. The output of the filter 71 is connected to the input of the gain medium 10.

Figure 3A:
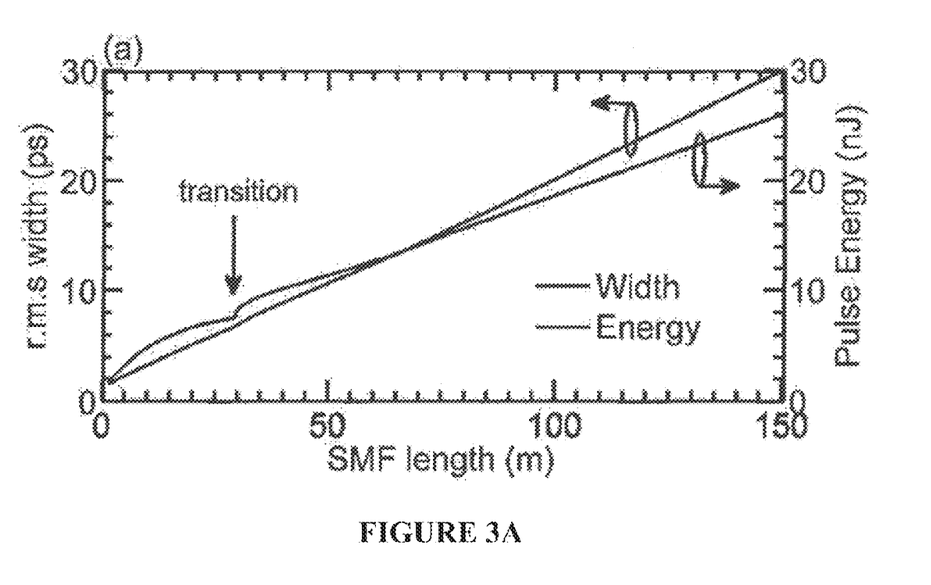
FIG. 3(a) shows a graph of fibre length verses RMS pulse width and pulse energy.
Figure 3B:
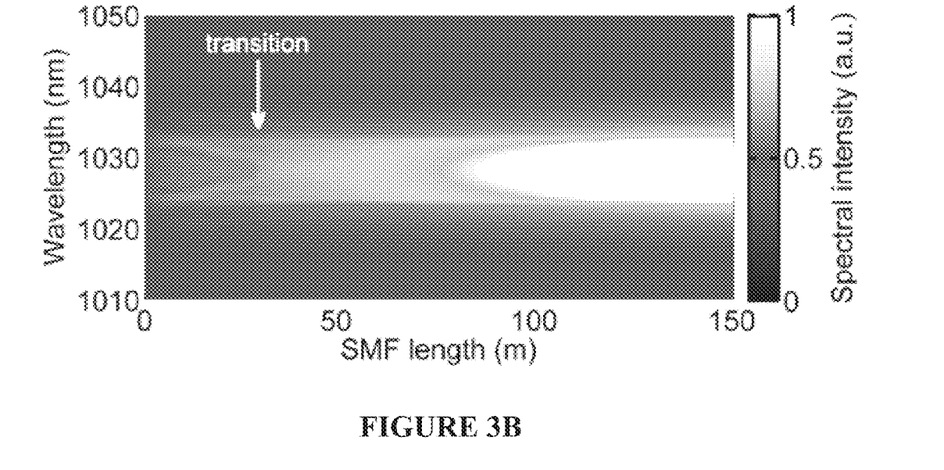
FIG. 3(b) shows a graph of fibre length verses wavelength and spectral intensity.
Figure 4A:
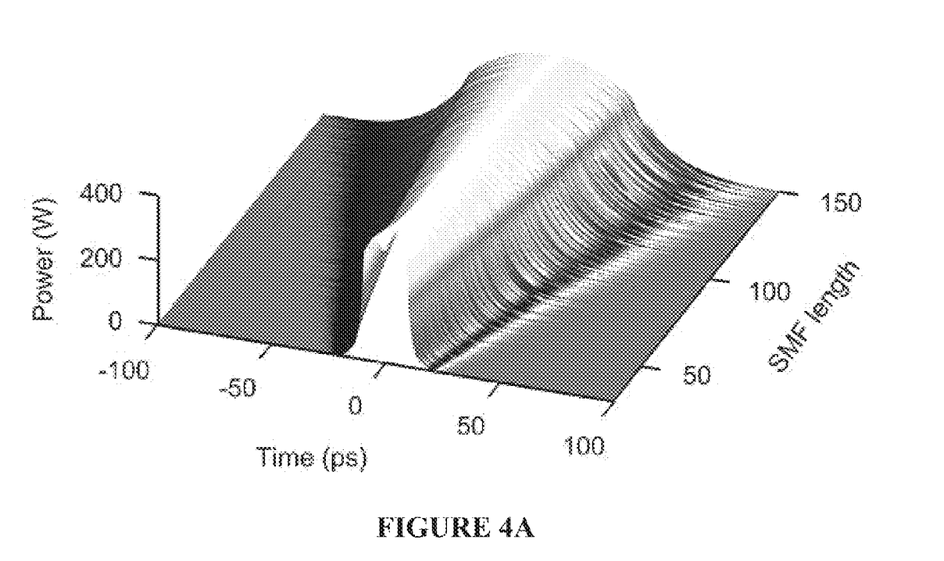
FIG. 4(a) shows a simulated output pulse profile versus SMF length.
Figure 4B:
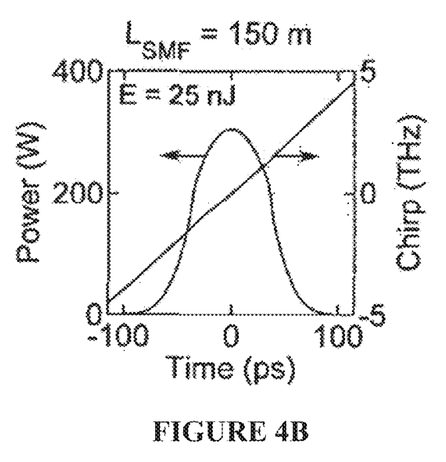
FIG. 4(b) shows a graph of pulse power and chirp for a 150 m length of fibre.
Figure 4C:
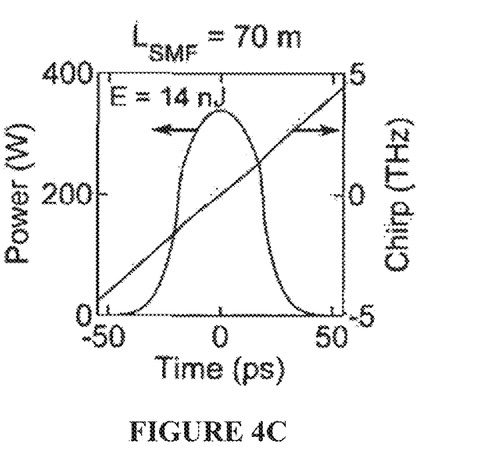
FIG. 4(c) shows a graph of pulse power and chirp for a 70 m length of fibre.

FIGS. 3 and 4 show an example of a simulated cavity output for the cavity shown in FIG. 2. In particular, FIG. 3(a) shows a graph of pulse energy and r.m.s. duration of the simulated output pulses as a function of the length of SMF ($L_{SMF}$) 31. The output energy initially increases then begins to saturate after approximately 30 m before abruptly transitioning into a regime of linear growth.

FIG. 3(b) shows the output spectrum of the simulated output spectrum where the transition is also apparent, suggesting that at this SMF length the oscillator transitions from one mode-locking regime to another. The desired GCO-regime achieved for $L_{SMF}$>30 m corresponds to output pulses characterized by high energy, long temporal duration and a large linear chirp.

FIG. 4 shows pulse temporal characteristics of the output pulse change for increasing $L_{SMF}$. In particular, FIG. 4(a) shows that as the SMF length increases the output pulses become ever broader, yet retain an almost constant temporal shape. This is also confirmed in FIGS. 4(b) and 4(c) where we plot the temporal profile in more detail for selected $L_{SMF}$. FIGS. 4(b) and 4(c) also show the frequency chirp associated with the output profiles and observe linear variation for both cases. The output pulse energy can be increased simply by increasing the length of the SMF 31. The pulse energy can exceed 10 nJ using short lengths of SMF 31.

Figure 5A:
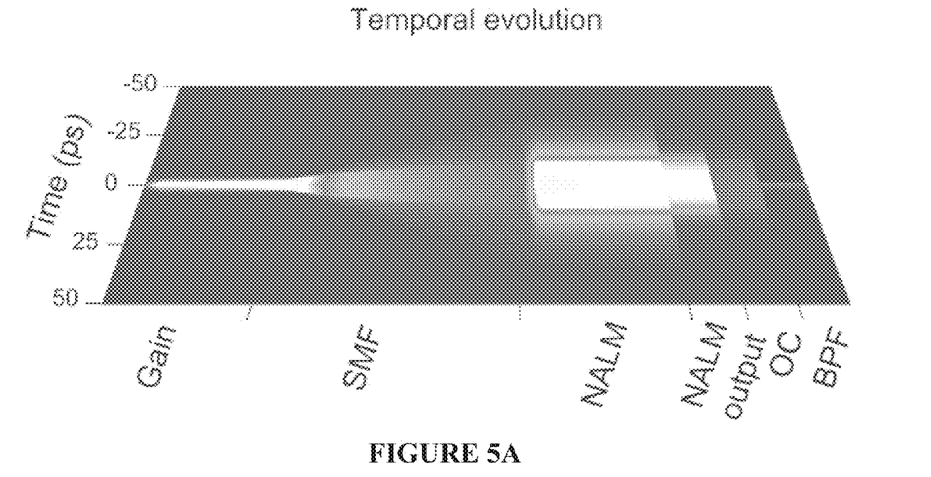
FIG. 5(a) shows a plot of the temporal evolution of a pulse propagating though the laser.
Figure 5B:
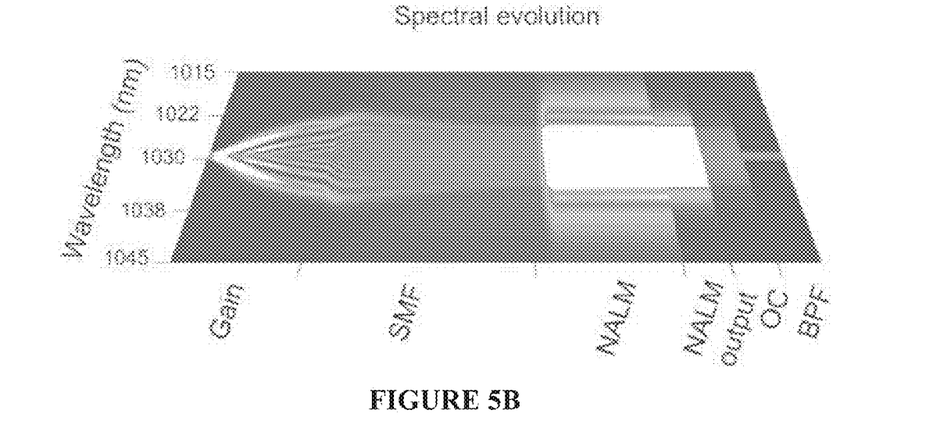
FIG. 5(b) shows a plot of the spectral evolution of the pulse propagating though the laser.
Figure 6A:
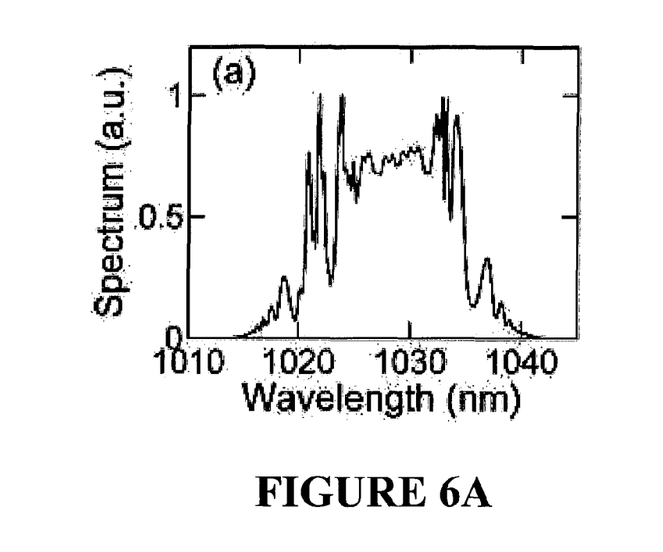
FIGS. 6(a) and 6(b) show the laser output spectrum.
Figure 6B:
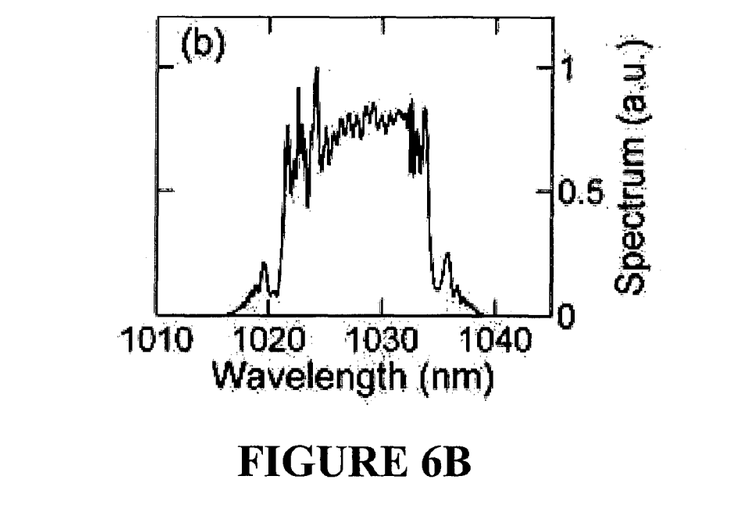
Figure 6C:
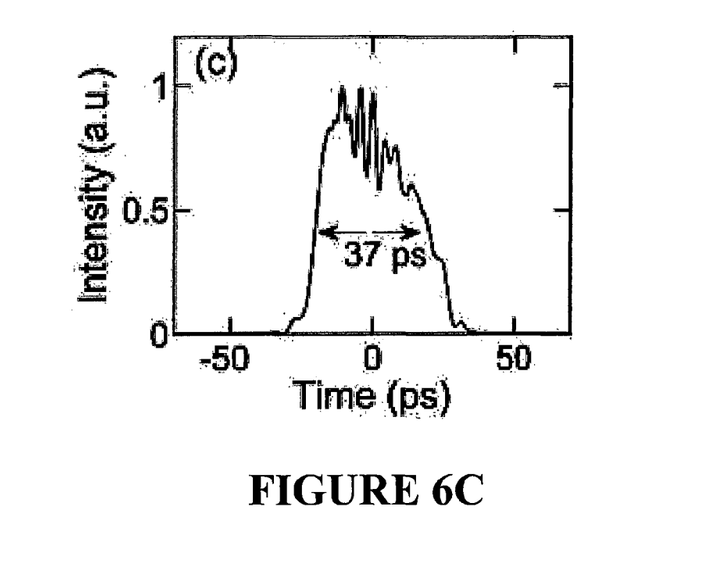
FIGS. 6(c) and 6(d) show the temporal profiles retrieved from a FROG trace before a grating pair.
Figure 6D:
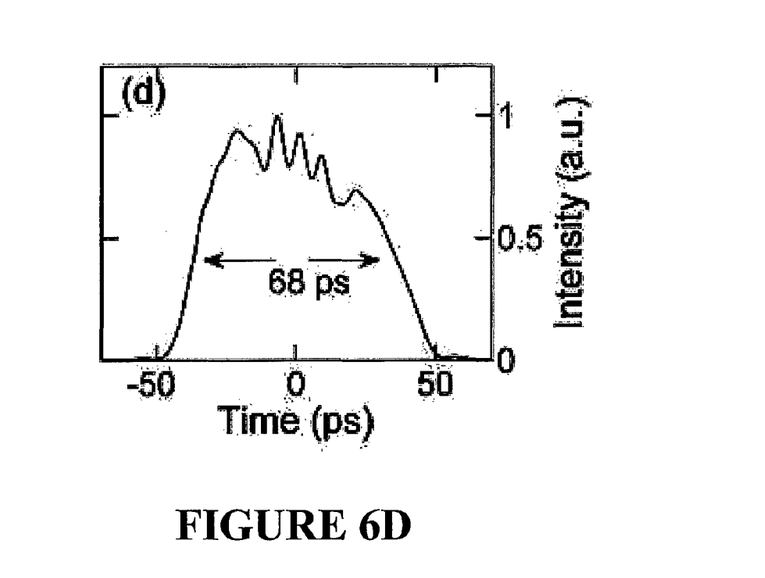
Figure 6E:
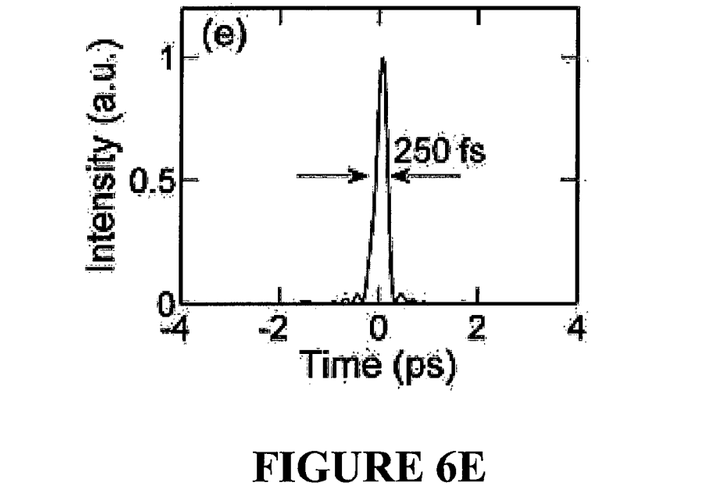
FIGS. 6(e) and 6(f) show the temporal profiles retrieved from a FROG trace after a grating pair.
Figure 6F:
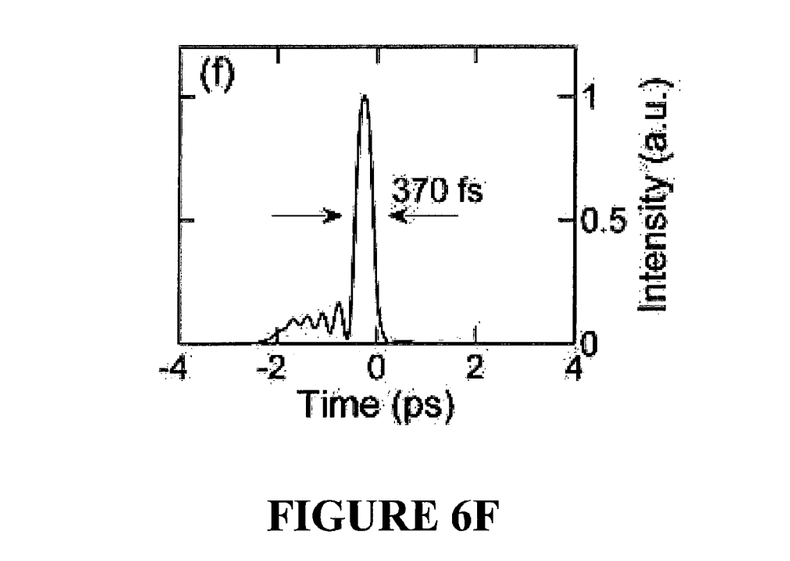

FIGS. 5(a) and 5(b) show the temporal and spectral evolution of the pulse inside the simulated cavity as shown in FIG. 2, over one round trip and for a fixed length of SMF 31 of 50 m. Note that only the counter-clockwise propagation inside the NALM is shown for simplicity. FIG. 5(a) shows the amplified pulse undergoes significant stretching in the section of SMF 31 before being re-amplified in the NALM. The SMF 31 acts to temporally stretch the pulse between the two active fibres in the gain medium 13 and the NALM 45, allowing for the gain medium in the NALM 45 to amplify the pulse without inducing detrimental wave-breaking effects. FIG. 5(b) shows the spectral width of 1.7 nm at the beginning of the roundtrip is broadened during propagation to nearly 15 nm when it is incident to the filter 71. The majority of the spectral broadening occurs in the gain fibre 13, whilst evolution in the SMF is quasi-linear.

FIG. 6 shows the experimentally recorded laser output spectrum (a, b) and temporal profiles retrieved from a FROG trace before (c, d) and after (e, f) grating pair compression for both the 50 m and 100 m SMF lengths. The experimental cavity substantially corresponds to the example of the laser 2 shown in FIG. 2. The cavity is constructed using a polarisation maintaining optical fibre splicer and the laser output diagnosed with a fast photodiode, optical and radio-frequency (RF) spectrum analyzers and a commercial frequency-resolved optical gating (FROG). A grating pair with 1200 lines/mm may be used to recompress the output pulses external to the cavity.

In order to further experimentally investigate the role of the SMF 31 separating the main gain fibre 13 and the NALM 40, experiments were performed with a 50 m and 100 m length of PM-980 optical fibre. Advantageously, the laser 2 could be mode locked simply by adjusting either or both of the pump diode drive currents 12, 42. The laser emits a stable train of pulses when mode locked. The laser is operable to advantageously provide approximately 60 dB signal-to-noise ratio of in the first RF harmonic. The laser is insensitive to thermal and mechanical stress, and further, the laser can be operated without interruptions for extended periods of time.

Figure 7:
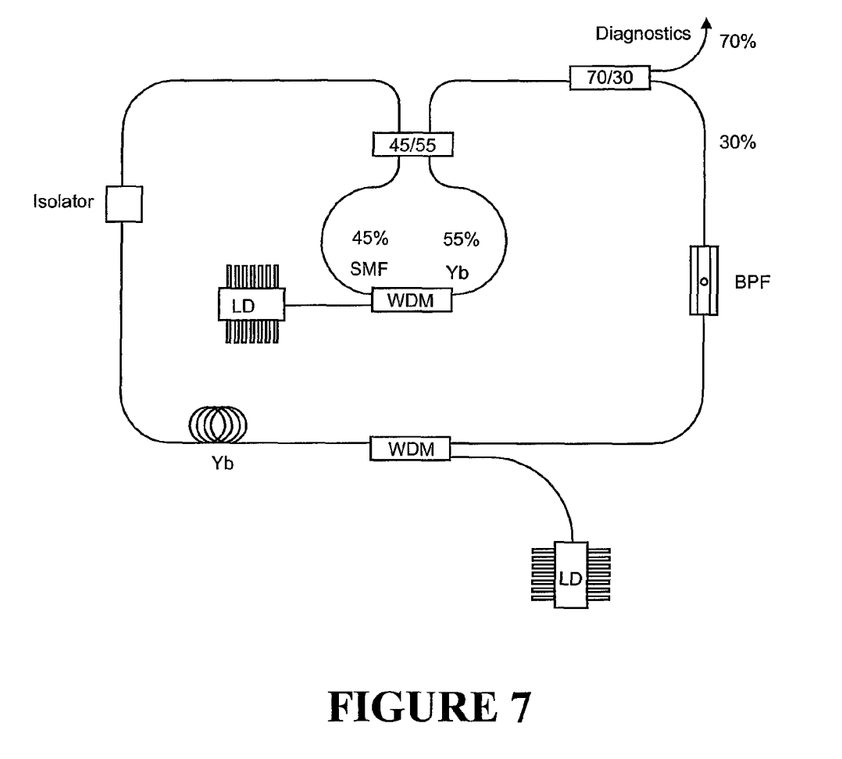
FIG. 7 shows another example of a laser configuration.

FIG. 7 shows another example of a laser configuration. The laser has a gain medium constructed from a 5 m long low doped Yb doped fibre. The Yb doped fibre is preferably pumped from a 976 nm diode based light source coupled into the gain medium through a wide band coupler. The output of the gain medium is coupled to the input of a length of SMF fibre. The output of the SMF fibre is connected to an optical isolator. The isolator is connected to a mode locking device. In this example, the mode locking device is a NALM comprising a 55/45 optical coupler having a first connection to receive light from the isolator, a second connection to couple light to a 5 m length of SMF, a third connection to couple light to a 0.5 m length of highly doped Yb doped fibre, and a fourth connection to output light from the NALM. The ends of SMF and doped fibre are connected to a wide band coupler that allows the Yb doped fibre to be pumped by a 976 nm diode based light source. The output from the NALM is connected to an output coupler which provides a first light output where 70% of the light is coupled out from the cavity and the second output 30% is connected to a band pass filter. The filter has a bandwidth of 1.7 nm and preferably has a centre frequency located substantially at the desired pulse centre frequency. The output of the filter is connected to the input of the gain medium.

Figure 8:
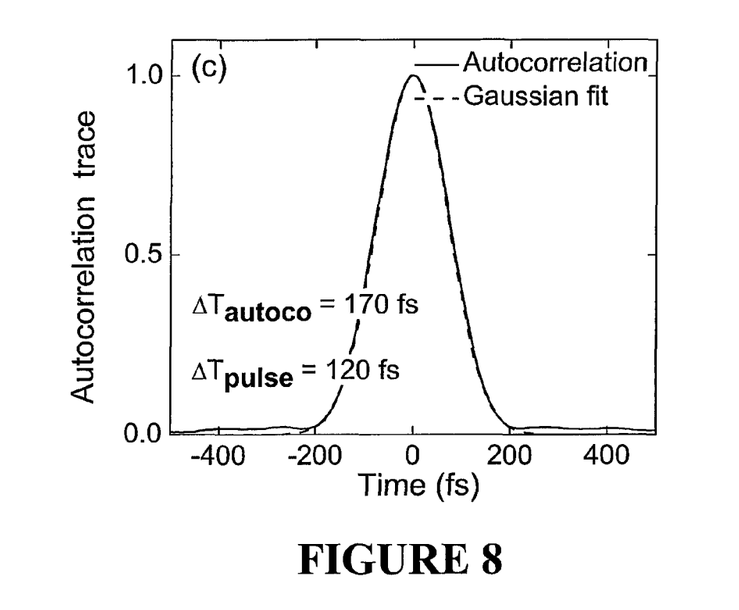
FIG. 8 shows the measured autocorrelation of the base laser configuration showing a measured pulse width of 120 fs.

FIG. 8 shows the measured autocorrelation of the base laser configuration showing a measured pulse width of 120 fs. A theoretical Gaussian profile (dashed line) is overlaid with the pulse to show a close match.

Figure 9:
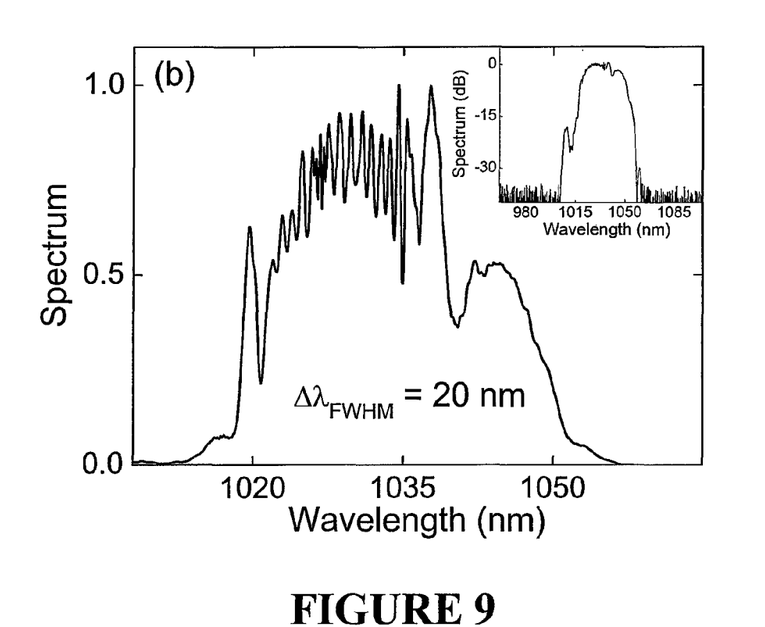
FIG. 9 shows the normalised spectrum and actual spectrum (inset) of the laser configuration of FIG. 7 as measured with an optical spectrum analyser.

FIG. 9 shows the normalised spectrum and actual spectrum (inset) of the laser configuration of FIG. 7 as measured at the output with an optical spectrum analyser.

The laser advantageously provides for tuning of the generated pulse characteristics simply by changing the length of the SMF section. Shortening the SMF section will produce larger repetition rates, lower pulse energies and durations whereas lengthening the SMF will allow for the delivery of larger pulse energies and durations but lesser average powers due to decrease in repetition rate.

For example, a length of SMF up to 100 m will create pulses having a pulse energy, duration and repetition rate ranging between 2-15 nJ, 10-70 ps and 10-1.5 MHz respectively. All SMF lengths allow for the pulses to be externally compressed to below 500 fs.

The preferred embodiments further provide a laser with a repetition rate that can easily be set to a desired frequency, '$f_{rep}$'. The length L of the SMF section can be approximated by $L=c/(n*f_{rep}')$ where 'n' is the refractive index of silica and 'c' the speed of light. The length also relates to the accessible pulse energy. Alternatively, if 'X nJ' pulse energy is desired then the SMF length can be approximated by $2.5$ nJ+$0.15$ nJ*L=X nJ, where X nJ is the target energy desired. Those skilled in the art will appreciate the 'X nJ' target will often require some experimental iteration to get the most desirable length.

The laser may also advantageously be tuned to a variety of operating wavelengths. For example, the gain mediums may be implemented using Thulium or Holmium doped fibres to implement a 'mid-infrared' laser as these fibres have a gain bandwidth operational for wavelengths greater than 1.9 µm. Those skilled in the art will appreciate fibres offering normal dispersion at the desired operational wavelength will be required for the laser to operate. For example, a small core PCF silica fibre may be used for an operating wavelength of approximately 1.9 µm. Alternatively, non-silica glass fibres may be used.

Industrial applications for the preferred embodiments of the laser include atmospheric transmission either for civil or military applications where a transmission wavelength of around 2 µm wavelength may be desired as it is safe for eyesight. Other applications include spectroscopy, LIBS (Laser-Induced Breakdown Spectroscopy), medical applications such as eye surgery (Cornea surgery), material processing and especially plastic material which are transparent in the visible or at 1 µm, generation of an intense THz source, high order harmonics generation and attosecond pulse generation.

To date energy range of pulses produced by the laser is in the range of 0.2 nJ to 20 nJ. However, those skilled in the art will recognise that higher pulse energies can be expected. For example, the use of 'large core' (larger core than standard SMF) optical fibres could be used in the cavity 1 to further increase pulse energy. Such large core fibres should also be designed such that support a single mode. Such large core fibres typically have a core size of, for example, at least 10 µm. Some large core fibres have a mode area greater than 20 µm.

The oscillator has been shown to be operable to generate a pulse that is temporally broad, has a low-repetition rate, high-energy and a very large linear chirp. In addition, the pulses have a chirp that is substantially linear and positive.

Other parameters of the output pulse include that: The pulses are compressible to less than 120 fs. The pulses have duration of at least 4 ps. The pulses have duration of up to 150 ps. The pulses have a repetition rate of at least 1.4 MHz. The pulses have a repetition rate of up to 15 MHz. The pulses have spectral bandwidth of at least 3 nm. The pulses have spectral bandwidth of up to 26 nm. The pulses have spectral bandwidth of up to 40 nm.

Wherein the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A laser apparatus operable to generate giant chirp pulses having a center frequency, comprising optical fiber based components arranged to form a cavity, the components comprising:
   a first gain medium,
   an optical isolator,
   a length of single mode fiber,
   a passive mode locking device,
   an output coupler, and
   an optical filter,
   wherein the optical filter is configured between an output of the passive mode locking device used by the cavity and an input of the first gain medium,
   wherein the mode locking device is a nonlinear amplified loop mirror including:
   an optical coupler configured to provide an input and an output, and
   a second gain medium with a pump source operable to provide energy to a propagating pulse,
   wherein the optical coupler has a 55/45 ratio, and wherein the optical fiber components are polarization maintaining components.

2. The laser as claimed in claim 1, wherein the components have, or substantially have, a normal dispersion relative to the center frequency.

3. The laser as claimed in claim 1, wherein the components have a net normal dispersion relative to the center frequency.

4. The laser as claimed in claim 1, wherein the mode locking device is operable to mode lock the laser by varying the energy of the light from the pump source.

5. The laser as claimed in claim 1, wherein the length of single mode fiber is configured in the cavity to receive light from the first gain medium and output light to the nonlinear amplified loop mirror.

6. The laser as claimed in claim 1, wherein the length of single mode fiber is operable to impart broadening to a pulse propagating within it.

7. The laser as claimed in claim 1, wherein the laser is operable to generate giant chirp pulses comprising a chirp that is substantially linear and positive.

8. The laser as claimed in claim 1, wherein varying the length of the single mode fiber varies at least one or more of the pulse repetition rate, the pulse energy or the pulse duration.

9. The laser as claimed in claim 1, wherein the optical filter has an operating bandwidth centered at or approximately at a desired pulse wavelength, and a pass-bandwidth configured to substantially reduce the bandwidth of the giant chirp pulses.

10. The laser as claimed in claim 9, wherein the optical filter has a pass-bandwidth of about 1.7 nm.

11. The laser as claimed in claim 1, wherein the length of single mode fiber is up to 200 m in length.

12. A laser apparatus operable to generate giant chirp pulses having a center frequency, comprising:
    optical fiber based components arranged to form a loop, the components arranged in a unidirectional sequence of:
    a first gain medium,
    a length of single mode fiber,
    a passive mode locking device,
    an output coupler, and
    an optical filter optically coupled to the first gain medium to close the unidirectional sequence,
    wherein the loop further comprises an optical isolator located between the first gain medium and the passive mode locking device in the unidirectional sequence, and
    wherein the optical isolator is oriented to configure the giant chirp pulses to follow the unidirectional sequence,
    wherein the mode locking device is a nonlinear amplified loop mirror including:
    an optical coupler configured to provide an input and an output, and
    a second gain medium with a pump source operable to provide energy to a propagating pulse,
    wherein the optical coupler has a 55/45 ratio.

* * * * *